United States Patent Office
3,424,199
Patented Jan. 28, 1969

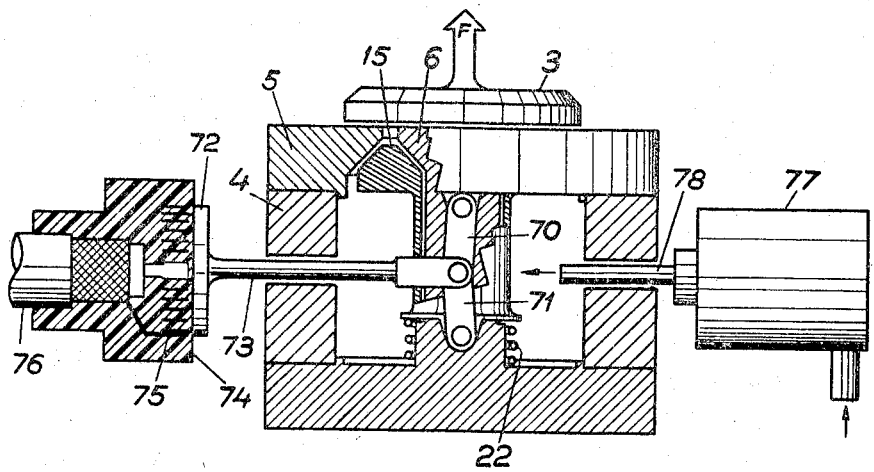
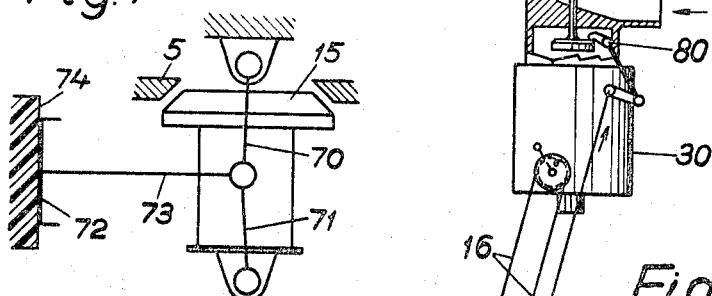
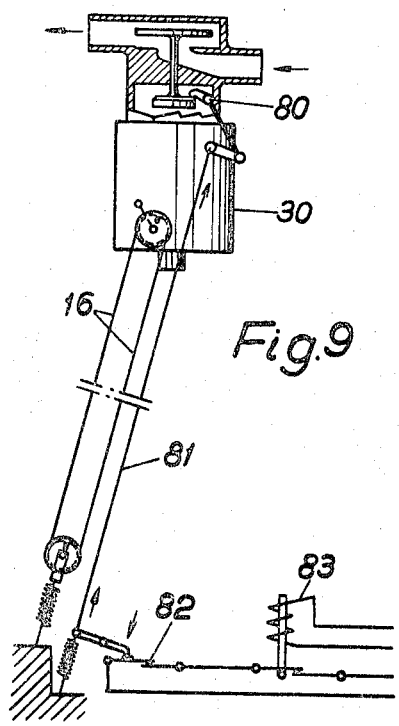
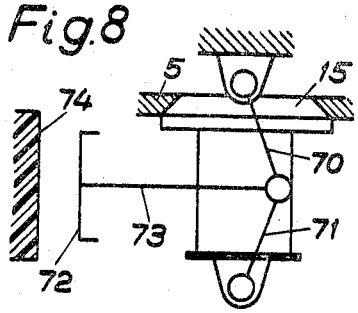

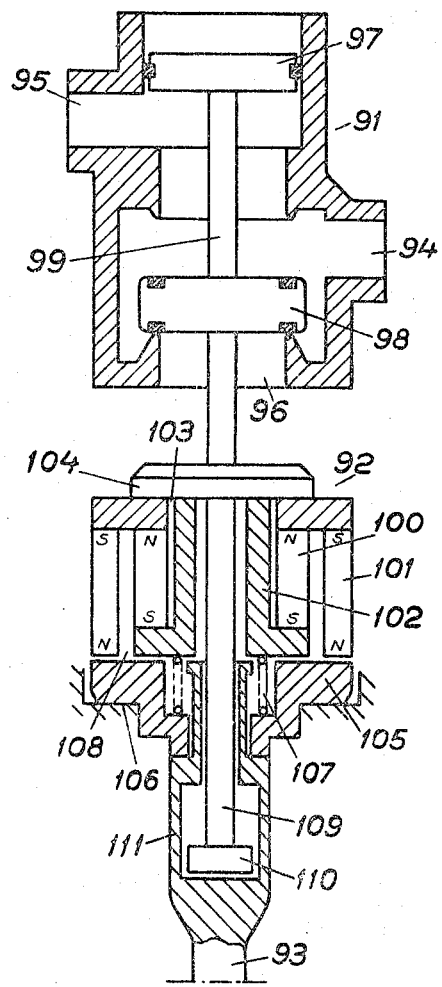

3,424,199
MAGNETICALLY OPERATED VALVE
Bo Breitholtz, Vasteras, and Fred Carlén, Pär Ahrnholm, and Karl Gustav Sindahl, Ludvika, Sweden, assignors to Allmanna Svenska Elektriska Aktiebolaget, Vasteras, Sweden, a corporation of Sweden
Filed Apr. 12, 1966, Ser. No. 542,124
Claims priority, application Sweden, Apr. 12, 1965, 4,716/65, 4,717/65
U.S. Cl. 137—596
Int. Cl. F16k 31/08, 31/36; H01h 33/82
15 Claims

ABSTRACT OF THE DISCLOSURE

In an air blast circuit breaker, the blast valve is normally held closed against the action of the air pressure operating on it by a permanent magnet circuit having a gap therein which is bridged by an armature connected to the valve. A shunt armature is mounted so as to be movable to a position to form a parallel path for the holding flux through the armature so as to reduce the magnetic attraction on the armature and allow the valve to open.

---

In order to reduce the effects of short circuits in power networks it is particularly important that the circuit breakers intended for breaking the short circuit current can be released quickly. With breakers for very high voltages it has, however, proved to be difficult to effect a sufficiently quick release, due to the fact that the distance between the interruptor at high potential and the releasing device at earth potential is relatively great. For operating the interruptors of air blast circuit breakers it has been usual to use an insulating so-called control air conduit, arranged between the interruptors and the breaker support, on which electromagnet-actuated valves for the opening and closing of the breaker have been arranged. This arrangement has, however, the disadvantage that the opening of the breaker is delayed for the time which is needed for the compressed air to pass through the control air conduit. This time can rise to the order of 20 ms. (milliseconds) at the tube lengths which must be used at the highest service voltages which are present, which time is a considerable part of the breaker's breaking time. Certain constructional difficulties are also present in the operating system when the releasing is effected by means of a displaceable operating rod, due to the fact that in previously known operating means this relatively long rod must transmit a relatively large force.

The operating means constructed according to the present invention comprises a compressed air valve arranged at high potential and an operating mechanism for the operation of the valve. This mechanism comprises a magnetic circuit provided with an air gap and containing a permanent magnet, as well as a holding armature connected to a valve disc in said valve, which holding armature is arranged so that in the one position of rest of the valve disc it forms a bridge over said air gap and is thereby kept in this position by a magnetic holding force working against an external force. The arrangement is characterised in that for the opening of the circuit breaker a shunt armature is movable to a shunt position in which it forms a parallel path for the magnetic flux through the holding armature. As said armature thereby shunts the flux generated by the permanent magnet and passing through the holding armature, the attracting force of the magnet on the holding armature is reduced so much that the holding armature separates from the magnet poles. The displacement of the shunt armature can be carried out in a short time and with a small amount of work in relation to the forces which are released, so that a particularly short releasing time for the breaker can be obtained.

Figure 4:
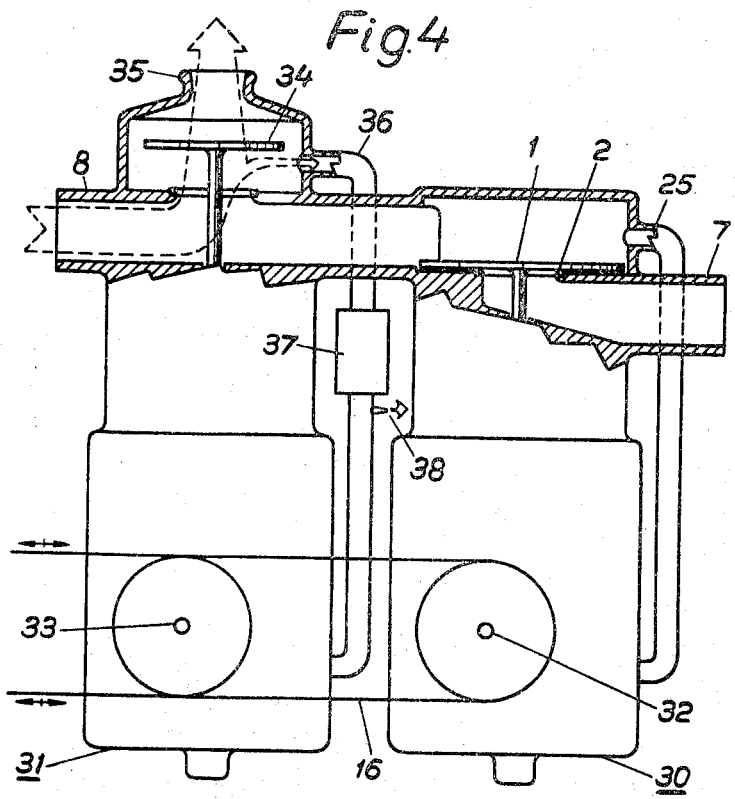
Figure 5:
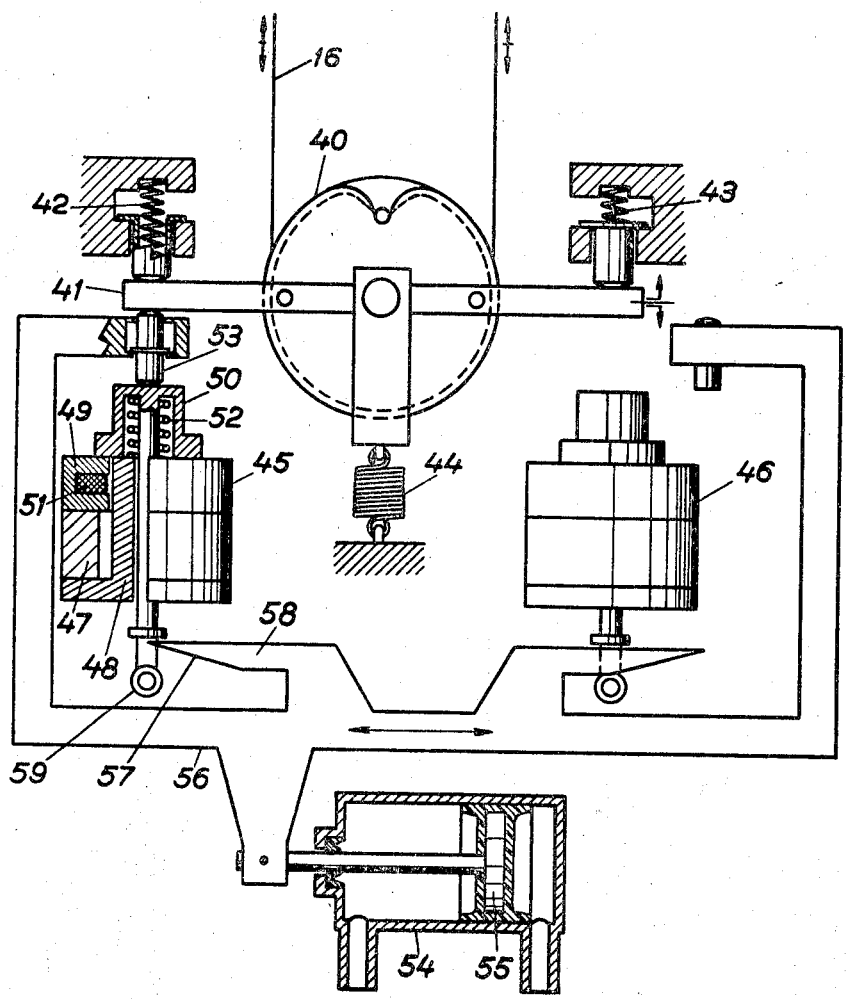

In the closed position of the valve the valve disc connected to the holding armature is suitably influenced in the opening direction by compressed air which is stored in a container arranged at high potential. The displacement of the shunt armature into the shunt position, which in its turn causes the opening of the compressed air valve and the releasing of the breaker, can with advantage be effected through cables or rods of insulating material from an operating device placed at earth potential. Other suitable further developments of the invention are evident from the following description of the embodiments which are shown in the accompanying drawing, where FIG. 1 shows a compressed air valve with operating mechanism, FIGS. 2 and 3 show the principle of how this compressed air valve is opened, FIG. 4 shows two compressed air valves joined together of the type shown in FIG. 1, with which opening as well as closing of an interruptor can be effected, FIG. 5 shows an operating device arranged at earth potential, FIG. 6 shows an operating mechanism as an alternative to that shown in FIG. 1, FIGS. 7 and 7 show the principle of how the mechanism according to FIG. 6 functions, FIG. 9 shows a means for signalling faulty operation in a valve according to FIG. 1 and FIG. 10 shows an alternative embodiment of a compressed air valve with operating mechanism.

Figure 1:
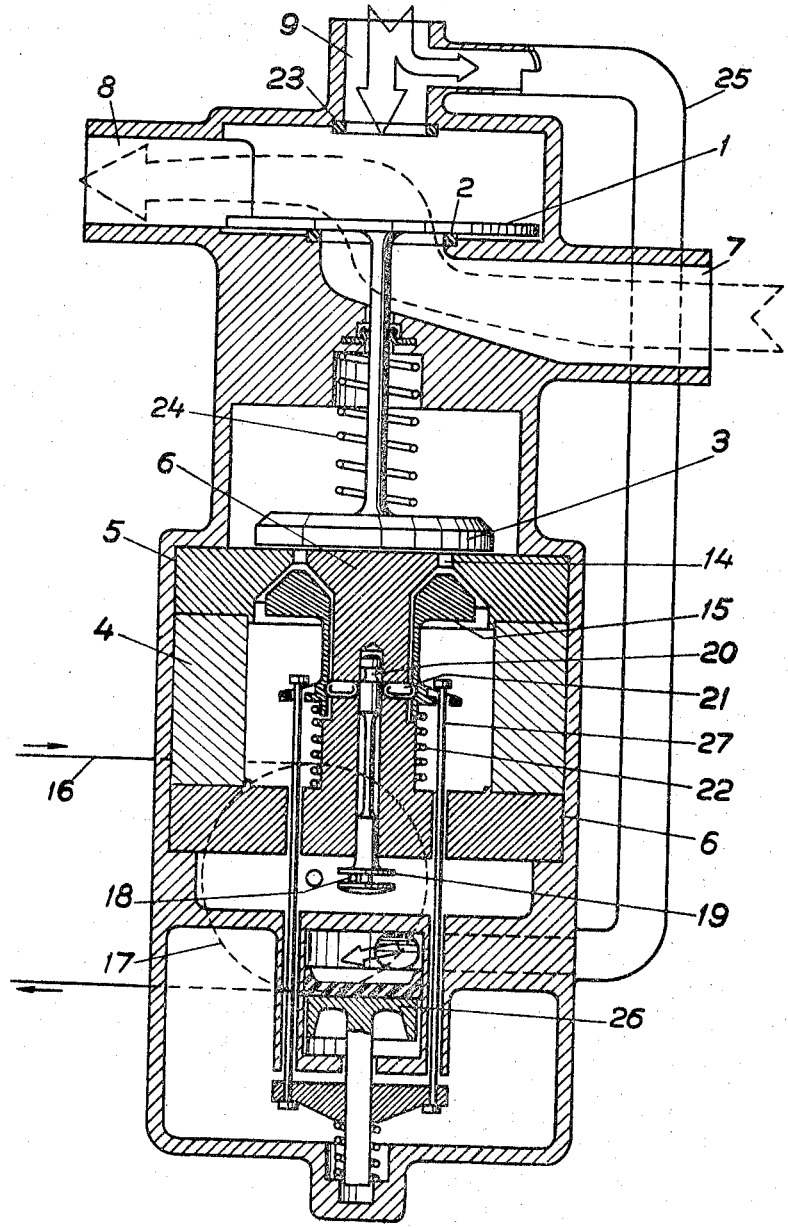

The compressed air valve shown in FIG. 1 is placed at high potential in the vicinity of an interruptor, not shown, for an air blast circuit breaker. This interruptor can for example be of the type which has a power-break which is opened when an operating cylinder is put under pressure and remains in the open position as long as the pressure is maintained in the cylinder. When the power-break is to be closed the cylinder is emptied and remains in uncompressed condition as long as the power-break is to be closed. The valve shown comprises a valve disc 1 which is pressed towards its seat 2 by a holding armature 3 connected to the valve disc 1, being attracted by a permanent magnet 4 through the pole shoes 5 and 6. In the figure the valve disc is shown in its position of rest, in which it blocks the connection between the conduit 7 which is connected to a filled container, not shown, at high potential, and the conduit 8 which is connected to the operating cylinder of the interruptor, not shown. The conduit 8 is also in connection with a control air conduit 9 which leads down to earth potential.

Figure 2:
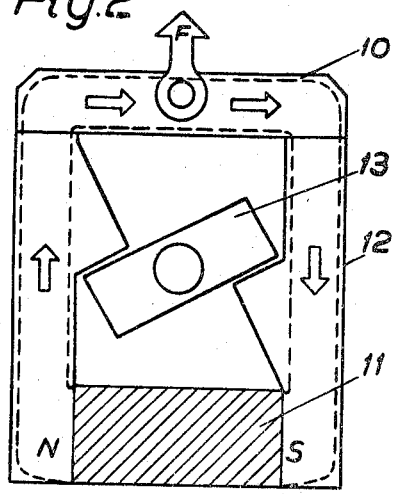
Figure 3:
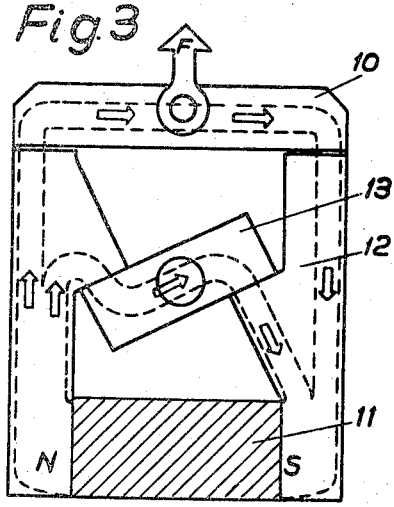

The principle of how the compressed air valve is opened is evident from FIGS. 2 and 3. The holding armature 10 is attracted by the permanent magnet 11 through the pole shoes 12, whereby the path of the magnetic flux is as shown in FIG. 2. If the shunt armature 13 is turned to the position shown in FIG. 3, the flux emanating from the permanent magnet 11 will be divided between the shunt armature 13 and the holding armature 10. Thus the force with which the armature 10 is attracted is reduced, so that the upwardly directed force F preponderates and the armature 10 separates from the magnet poles.

In FIG. 1 the interruptors shown in FIGS. 2 and 3 are found in another form and with other designations. The permanent magnet 4 and the pole shoe 5 connected to it are ring-shaped and between this pole shoe and the central pole shoe 6 a ring-shaped air gap 14 is formed. The ring-shaped shunt armature 15 is placed concentrically with this air gap. The transmission means for transferring the opening impulse from earth potential includes an actuating member comprising a cable 16 of insulating material, by means of which a pulley 17 arranged on the operating mechanism of the valve can be turned. Instead of the cable 16, an insulating rod can, of course, be used. When a breaking impulse reaches the breaker from the over current relays, an operating device placed at earth potential will influence the cable 16 so that it is displaced a little. A pin 18 placed eccentrically on the pulley 17 thereupon describes an angular movement, so that the slide 19 is drawn downwards. When the slide has been drawn so far down that its recess 20 is level with the blocking bodies 21, the shunt armature 11 is released. The shunt armature is thus moved into its upper shunting position by the magnetic forces and by a spring 22 placed beneath the armature. (If the magnetic force acting on the shunt armature is sufficiently great, this spring can be eliminated.) When the shunt armature 15 is in its upper position such a large part of the magnetic field flux is led from the permanent magnet 4 through the shunt armature 15 that the holding armature 3 is separated from the magnet poles by the compressed air from the conduit 7 acting on the valve disc 1. The disc thus begins to move upwards, so that the compressed air flows from the compressed air container, not shown, through the conduits 7 and 8 in the way shown by the broken arrows. Thus the operating cylinder of the interruptor not shown is set under pressure, so that the power break starts to open. The valve disc 1 moves quickly to its upper end position, where there is a packing 23, so that the compressed air is prevented to any great extent from escaping through in the insulating control air conduit 9 which leads down to the support at the breaker of earth potential. At the same time as the operating device placed at earth potential receives an opening impulses, a compressed air valve in the earth end of the control air conduit 9, not shown, starts to open and compressed air starts to flow into the control air conduit 9. When gradually air of the same pressure as in the conduit 7 comes up into the conduit 9 on the upper side of the valve disc 1, this discs starts to drop due to its own weight and to a spring 24. When the valve disc 1 has reached its lower end position, the holding armature 3 is again attracted by the permanent magnet 4 and the valve is again closed. During this time the air has gone down in the conduit 25 to the resetting piston 26. The resetting is carried out in that a piston draws the shunt armature 15 out of its upper position through the pull rods 27, until the shunt armature reaches a lower stop position. Then the blocking device 19, 20, 21 again operates as the pulley 17 is drawn back to the original position by means of the operating device placed at earth potential, for example by a spring which was stretched when the pulley 17 was turned clockwise. When the breaker is to be closed, the conduits 9 and 25 are emptied through a valve placed in the earth end of the control air conduit 9.

With breakers which are provided with the operating device according to FIG. 1, thus quick opening can be effected by means of the valve being placed at high potential, but the rest of the operation is carried out by air supplied through an insulating air duct. In principle, the same arrangement can however also be used in an operating system where the opening as well as the closing of the breaker is effected by means of insulating operating rods or lines, and where thus no control air conduit to earth potential is required. FIG. 4 shows such an operating system comprising two valve units 30 and 31 of a similar type to that shown in FIG. 1. The valve units are mounted at high potential in the immediate vicinity of an interruptor, not shown, of an air blast circuit breaker. The impulse transmission from earth potential is carried out in the same way as described above by means of an insulating cable 16. In the embodiment shown in the figure the impulse transmission is carried out over two shafts 32 and 33, but it is also feasible that a common shaft can be arranged through the two valve units. When an impulse is transmitted the shafts are turned clockwise or counter-clockwise from a zero position. Clockwise turning may for instance cause the opening of the breaker, while counter-clockwise turning causes the closing. When the unit 30 receives an impulse over the transmission system 16, the valve disc 1 opens the connection between the compressed air conduit 8 and an outlet 7 therefrom in the way described for FIG. 1. Thereby compressed air flows in the direction from right to left, i.e., from the compressed air container not shown to the interrupter, also not shown, so that an opening movement starts. As soon as the valve disc 1 has opened, compressed air is also led through the conduit 25 to the piston system, which resets the shunt armature in the magnet system of the unit 30. After a time, the same pressure will prevail on both sides of the valve disc 1, so that the disc, by its weight and/or by the influence of the spring, again is positioned against its valve seat in the sealing position.

The operating cylinder of the interruptor is now under pressure and its power break has opened and remains open until the unit 31 is given an impulse. This is carried out by a turning of the shaft 33 in a counter-clockwise direction, so that the valve disc 34 opens. Thus compressed air from the interruptor flows through the conduit 8 and the restriction 35 and out through another outlet into the free air. Gradually atmospheric pressure will prevail in the conduit 8 so that the valve disc 34 will again close. The restriction 35 serves to give a certain over pressure in the conduit 36 so that the piston system for resetting the shunt armature of the unit 31 can operate. Possibly a check valve 37 can be arranged in order to accumulate the pressure in the piston system during the time which is required for the resetting of the shunt armature. The air leak 38 ensures however that the pressures does not accumulate for a longer time than is necessary. At this stage the power break of the interruptor has closed and the valve units 30 and 31 have returned to their positions of rest and are ready for a new operating cycle.

The set of apparatus at earth potential, which is necessary for operating the "twin unit" shown in FIG. 4, is shown schematically in FIG. 5. The lower part of the electrically insulating cables 16 are fixed to a pulley 40, which is fixed to a lever or bar 41. The cable 16 could possibly be fixed directly to the rod 41, so that the pulley 40 can be omitted. Two relatively weak springs 42 and 43 keep the rod 41 in a zero position. The spring 44 holds the cables 16 stretched and evens out the length changes, due for example to differences in temperature. Two holding magnets 45 and 46 can, through the rod 41 and the line transmission system 16, transmit closing and opening impulses to the twin unit according to FIG. 4. Said holding magnets each consist of a ring-shaped permanent magnet 47 which, through a core 48 and a pole shoe 49, attracts an armature 50. In the position shown the magnet 45 is ready to operate. By giving an electric impulse to the coil 51, the armature 50, strongly biased through the spring 52, can be separated from the magnet, so that the rod 41 is quickly raised by means of the peg 53 which is biased by a weak spring. The transmission system has now changed position, for example to the position which causes the openuing of the interruptor, not shown. At this stage compressed air is led to the cylinder 54 through the right-hand conduit, so that the piston 55 moves the yoke 56 to the left. The armature 50 is thereby drawn back to the original position by means of an arm 58 fixed on the yoke and provided with an oblique bevel 57 which is pressed against the roll 59. At the same time the peg 53 is drawn out of the original position while the peg on the opposite side is moved to the position between the armature of the magnet 46 and the rod 41. This rod has been reset to the zero position by means of the springs 42 and 43 during the movement of the yoke.

In FIGS. 6, 7 and 8 as an alterantive another means for moving the shunt armature 15 in a magnet system according to FIG. 1 is shown. This means can be used assuming that there is sufficient electrical energy available at high potential. The magnet system 4, 5, 6, holds fast an armature 3 which is subjected to a vertical force F. The axially displaceable shunt armature 15 is operated by means of a link system 70 and 71 and an armature 72 with operating rod. The link 70 is mounted at its upper end in a bearing which is fastened on the under side of the upper ring-shaped pole shoe 5 of the magnet system. The link 71 is fixed in a bearing which is fixed further down in the guide bushing of the shunt armature 15. The two links 70 and 71 are connected to form a toggle joint, from which an operating rod 73 leads, which at its free end carries the aluminium armature 72.

The arrangement according to FIG. 6 is shown schematically in FIG. 7. The link system 70, 71 is here held in a self-locking position with the armature 72 resting against a fixed support 74. The shunt armature 15 is thereby locked in the open (inoperative) position. A coil 75 (FIG. 6) in the form of a copper strip which is wound in a spiral is embedded in insulation in the support 74. A capacitor at high potential, not shown, can be discharged through the coil 75 over the coaxial conductor 76 and a mechanical or electrical contact device operable from earth potential. Due to the magnetic field produced when current flows through the coil, eddy currents are induced in the armature 72, so that a repulsion force occurs between the armature 72 and the coil 75. This force pushes the armature very quickly to the position shown in FIG. 8. Thereby the toggle joint of the link system 70, 71 quickly passes out of the locking position and the shunt armature 15 is brought into the shunt position through a combination of partly the inertia of the armature 72, the operating rod 73 and the link system 70, 71, partly the magnetic attraction force which has been acting all the time on the shunt armature, and partly the force from the spring 22 which acts upwards on the guide bushing of the shunt armature. The resetting of the shunt armature 15 to the open position can, for example, be carried out by means of a compressed air cylinder 77 with which a pressure pin 78 can bt pushed in towards the toggle joint in the link system 70, 71, so that the toggle joint is again brought to the locking position. Thereafter the pressure pin 78 returns to its rest position. Instead of the coil 75 and the aluminum armature 72, a holding magnet of the same type which is placed in the operating device at earth potential may be used.

The arrangement shown in FIGS. 1 and 4 may be easily provided with a signal device which indicates if the valve for opening the interruptor opens by separation of the holding armature 3 from the permanent magnet 4 without an order having been given from the operating device at earth potential. Such a signal device is shown in FIG. 9. On the magnet-controlled valve 30 intended for opening the interruptor, a lever system 80 is arranged which is connected to an electrically insulating rod or line 81 which leads down to earth potential. The lever system 80 is influenced by the holding armature of the valve in such a way that the armature during its movement raises a lever which in its turn draws in an actuating member such as an insulating cable 81. This cable can suitably be positioned in the same space as the ordinary transmission system 16. The pulling on the cable 81 causes a contact 82 at earth potential to close, whereby an immediate order for closing can be sent through the transmission system 16 to the valve intended for the closing of the interruptor. Signals with alarm of faults can at the same time be sent out. During normal operation of the breaker, on the other hand, a relay 83 receives current, so that its contact opens the current circuit of the alarm contact 82. As soon as the normal operating cycle has been completed, the relay 83 is however again without current, its contact is closed and the signal device is ready to operate again immediately.

FIG. 10 shows a central cross section through another embodiment of a compressed air valve with operating mechanism according to the invention. The arrangement comprises three main parts, namely a compressed air valve 91, an operating mechanism 92 for the operation of the valve and an insulating operating rod 93. The device shown is placed at high potential in the vicinity of an interruptor, not shown, comprising a container supported by a pillar insulator and permanently filled with compressed air in which container a power-break is arranged. The movable contact of the power-break is operable by means of a pneumatic operating device, the power-break being opened when a space in the operating device is connected to open air and being closed when the same space is filled with compressed air. The compressed air valve 91 is provided with an opening 94 which is connected to said space in the operating device of the power-break, an opening 95 which is connected to said container permanently filled with compressed air and an opening 96 which is connected to open air. The valve 91 contains a differential piston comprising two separate pistons 97 and 98, which are fixedly connected to each other by means of a piston rod 99. The piston 98 also constitutes the movable valve member or valve disc. As the space between the pistons 97 and 98 is always filled with compressed air and the sealing surfaces of the pistons are different, the differential piston is influenced by an upward force.

The operating mechanism 92 contains two annular concentrically arranged permanent magnets 100 and 101, each being a part of two magnetic circuits provided with a common concentric yoke 102. The first magnetic circuit comprises the permanent magnet 100 and an annular air gap 103, across which a holding armature 104 forms a bridge. This armature is thereby traversed by a flux generated by the magnet 100 and is thereby attracted by the magnet against the effect of the upward force on the differential piston 97, 98. The second magnetic circuit comprises the permanent magnet 101 and a displaceable auxiliary armature 105. This auxiliary armature in its position of rest is pressed against a stop 106 of a spring 107, but by means of the operating rod 93 can be slightly adjusted upwards so that the armature forms a bridge over the ring-shaped air gap 108. The polarity of the permanent magnets is shown on the drawing where N denotes the north pole and S the south pole.

In the shown position of the piston 98 the power-break of the interruptor, not shown, is closed. If then for example a short circuit occurs in the network to which the breaker is connected, a breaking impulse from the protective relays is transmitted to an operating device connected to the operating rod 93 at earth potential. This operating device adjusts the rod 93 and thereby the auxiliary armature 105 upwards forming a bridge across the air gap 108. The magnet 101 thereby generates a magnetic flux which passes through the auxiliary armature 105, the yoke 102 and the holding armature 104. This flux counteracts the flux in the holding armature 104 generated by the magnet 100, thereby diminishing the holding force so much that the upward force on the differential piston 97, 98 preponderates, and the valve plate 98 is brought upwards to its second position of rest. Thereupon the operating device of the interruptor through the valve openings 94 and 96 is connected to the open air, so that the power-break opens and the short-circuit current is broken.

The power-break is closed by bringing the operating rod 93 downwards, thereby resetting the valve disc 98 and the holding armature 14 by means of a follower rod 109 connected to the holding armature 104 and going through the centre part of the operating mechanism 92. The free end of this rod is provided with a radially protruding follower 110 which with relatively great axial play is enclosed by the upper end part 92 of the operating rod 93. As soon as the valve plate 98 and the holding armature 104 are reset, and the power-break is thereby shut, the operating rod 93 returns to the position shown in the figure and is thus ready for a new breaking operation.

If the holding armature should separate from the magnet poles due to a fault in the operating means, the rod 93 is lifted upwards by the follower 110. If the rod 93 is then arranged to influence an electric contact in an indicating circuit at earth potential, indication of a fault in the operating means can be obtained in a particularly simple way.

Other embodiments than those described are also feasible within the scope of the following claims. Thus the shunt can be inserted in the permanent magnet circuit in other ways than those mentioned above, for example, by means of a compressed air piston or by a blasting substance which is brought to detonate mechanically or electrically.

We claim:

1. Operating means for a high voltage air blast circuit breaker comprising an air pressure valve arranged at high potential, and comprising a valve disc, an operating mechanism for the operation of said valve, said mechanism including a magnetic circuit, said magnetic circuit being provided with an air gap and including a permanent magnet, a holding armature connected to the valve disc of said valve, said holding armature including means to form a bridge over said air gap in one position of rest of said valve disc, means to exert an external force on said valve disc tending to move it away from such rest position, said holding armature being kept in bridging position by a magnetic holding force furnished by said magnetic circuit working against said external force, shunt armature means in said mechanism movable from an inactive position to a shunt position for opening said circuit breaker, said shunt armature means including means operable in said shunt position for forming a parallel path for the magnetic flux through the holding armature.

2. Means according to claim 1, in which said external force exerting means comprises compressed air stored in a container arranged at high potential.

3. Means according to claim 1, in which an actuating member of insulating material is connected to said shunt armature for movement thereof from a remote position.

4. Means according to claim 3, having a blocking device for normally holding the shunt armature in inactive position, and means connected to said actuating member to release said blocking device.

5. Means according to claim 4, in which the means to release the blocking device of the shunt armature includes a member turnably mounted on the operating mechanism of the valve.

6. Means according to claim 3, comprising two substantially similar valves placed at high potential, a pressure air conduit having two outlets therefrom, each of said two valves being arranged to control one of said outlets, a bar at earth potential and turnable in two directions around a zero position, said actuating member being connected to said bar, turning of the bar in one direction causing the one valve to open and a conduit, connected to one of the outlets to be put under pressure, while turning in the other direction causes the other valve to open and connects the pressure air to the free air.

7. Means according to claim 6, in which the operating device at earth potential comprises two holding magnets which upon demagnetization produce movement of the turnable bar connected to said actuating member.

8. Means according to claim 1, in which said permanent magnet is fixed, a toggle joint connecting said shunt armature to the fixed magnet circuit, a fixed support, a movable push rod extending from said toggle joint, the free end of the push rod having an armature secured thereon which, when the valve is closed, rests against said fixed support.

9. Means according to claim 8, in which said armature is made of electrically conducting material, and coil means in said support for generating a repulsion force between said armature and said support by passing a varying current through the coil.

10. Means according to claim 1, an operating circuit at earth potential, an electrical contact in said operating circuit and an insulating actuating member operatively connected with the holding armature and the contact for operating the contact.

11. Means according to claim 1, in which said shunt armature means comprised a second permanent magnet which causes a magnetic flux counteracting the flux in the holding armature generated by said first permanent magnet.

12. Means according to claim 1, in which an operating rod of insulating material is connected to said shunt armature means to move the shunt armature means to shunting position when the rod is subjected to pressure and to inactive position when the rod is subjected to tension.

13. Means according to claim 12, a follower rod directed in the longitudinal direction of the operating rod connected to said holding armature, said follower rod at its free end having a lost motion connection with the upper end part of the operating rod.

14. Means according to claim 12, in which the path of movement of the operating rod in the release direction is independent of the necessity for the release action.

15. Means according to claim 6, in which the path of movement of said operating rod for effecting a release is considerably smaller than the path of movement for effecting resetting.

References Cited

UNITED STATES PATENTS

| 2,117,132 | 5/1938 | Baermann | 335—295 |
| 3,089,064 | 5/1963 | De Bennetot | 335—229 XR |
| 3,212,751 | 10/1965 | Hassa | 251—65 |
| 3,302,146 | 1/1967 | Zocholl | 335—254 XR |

FOREIGN PATENTS 543,039  1/1932  Germany.

HENRY KLINKSIEK, *Primary Examiner.*

U.S. Cl. X.R.

335—236; 200—148; 251—65